(12) United States Patent
Baker et al.

(10) Patent No.: US 9,172,304 B2
(45) Date of Patent: Oct. 27, 2015

(54) CONSTANT INPUT CURRENT FILTER USING HIGH-FREQUENCY SWITCHING FOR POWER SUPPLIES AND RELATED SYSTEM AND METHOD

(75) Inventors: Everett E. Baker, Fort Wayne, IN (US); Bashirul A. Polash, Fort Wayne, IN (US); Christopher D. Ballard, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 5 days.

(21) Appl. No.: 13/406,309

(22) Filed: Feb. 27, 2012

(65) Prior Publication Data

US 2013/0221943 A1    Aug. 29, 2013

(51) Int. Cl.
*G05F 3/08* (2006.01)
*H02M 3/158* (2006.01)
*H04B 15/02* (2006.01)

(52) U.S. Cl.
CPC .................. *H02M 3/158* (2013.01); *G05F 3/08* (2013.01); *H04B 15/02* (2013.01); *H04B 2215/069* (2013.01)

(58) Field of Classification Search
CPC .......................................................... G05F 3/08
USPC ......... 323/282, 351, 222, 235, 265, 172, 100, 323/131, 311, 312; 327/551, 552; 333/172, 333/100, 131; 363/16, 17
See application file for complete search history.

(56) References Cited

U.S. PATENT DOCUMENTS

| | | | |
|---|---|---|---|
| 4,868,730 | A | 9/1989 | Ward |
| 5,036,269 | A | 7/1991 | Murari et al. |
| 5,087,871 | A | 2/1992 | Losel |
| 6,369,517 | B2 | 4/2002 | Song et al. |
| 6,841,981 | B2 | 1/2005 | Smith et al. |
| 7,102,359 | B2 | 9/2006 | Allen et al. |
| 7,638,991 | B1 * | 12/2009 | Kobayashi .................... 323/272 |

(Continued)

OTHER PUBLICATIONS

International Search Report dated Nov. 30, 2012 in connection with International Patent Application No. PCT/US2012/056387, 3 pages.

(Continued)

*Primary Examiner* — Matthew Nguyen
*Assistant Examiner* — Trinh Dang

(57) ABSTRACT

A system includes a constant input current filter configured to draw a constant input current from a power source and to generate a variable output current. The constant input current filter includes a capacitor, a boost converter, and a buck converter. The boost converter is configured to receive at least a portion of the input current and to charge the capacitor using at least the portion of the input current during first time periods associated with operation of a load. The buck converter is configured to discharge the capacitor and to provide an additional current as part of the output current during second time periods associated with operation of the load. The load could represent an electronic device having a time-varying output power characteristic, such as a wireless radio.

21 Claims, 3 Drawing Sheets

(56) References Cited

U.S. PATENT DOCUMENTS

| | | |
|---|---|---|
| 2005/0189965 A1 | 9/2005 | Tihanyi |
| 2006/0006850 A1* | 1/2006 | Inoue et al. ............... 323/265 |
| 2006/0172782 A1 | 8/2006 | Planning et al. |
| 2007/0194750 A1 | 8/2007 | Eager et al. |
| 2010/0026263 A1* | 2/2010 | Moussaoui et al. .......... 323/283 |
| 2011/0109159 A1 | 5/2011 | Davis et al. |
| 2011/0193495 A1* | 8/2011 | Mishima et al. ............. 315/307 |
| 2012/0007576 A1* | 1/2012 | Suntio et al. ................ 323/312 |
| 2012/0249111 A1* | 10/2012 | Guo ............................. 323/311 |
| 2013/0127437 A1 | 5/2013 | Baker et al. |

OTHER PUBLICATIONS

Written Opinion of International Search Authority dated Nov. 30, 2012 in connection with International Patent Application No. PCT/US2012/056387, 6 pages.

"Requirements for the Control of Electromagnetic Interference Characteristics of Subsystems and Equipment", Department of Defense Interface Standard, Dec. 2007, See esp. pp. 24-35, 269 pages.

U.S. Office Action dated Apr. 15, 2015 in connection with U.S. Appl. No. 13/302,125.

* cited by examiner

CONSTANT INPUT CURRENT FILTER USING HIGH-FREQUENCY SWITCHING FOR POWER SUPPLIES AND RELATED SYSTEM AND METHOD

GOVERNMENT RIGHTS

The U.S. Government may have certain rights in this invention as provided for by the terms of Contract No. FA8726-08-C-0008 awarded by the U.S. Air Force.

TECHNICAL FIELD

This disclosure is directed in general to power supplies. More specifically, this disclosure is directed to a constant input current filter using high-frequency switching for power supplies and related system and method.

BACKGROUND

Many electronic devices are subject to various rules or regulations regarding their operation and use. For example, new equipment designed to operate on military platforms often needs to comply with long-established specifications for controlling the ripple current that the equipment can draw from military power supplies. As a particular example, the MIL-STD-461 document issued by the U.S. Department of Defense defines the CE101 requirement for power leads operating in the 30 Hz to 10 kHz range on military aircraft and submarines.

Wireless radios under development today are intended to support more complex radio frequency (RF) waveforms than previous radios. In older radios, a suitable RF envelope was often achieved using frequency modulation (FM), which provides a continuous RF output and causes a radio's input current to be continuous and virtually ripple-free. The use of amplitude modulation (AM) often needed some filtering to achieve suitable ripple values. The filtering was relatively simple unless the modulation included frequency components below 100 Hz, so limiting the low-end bandwidth of a signal corrected the problem. However, with newer modulation techniques (such as Have Quick, SINCGARS, WNW, LINK16, and MUOS), RF envelope waveforms are typically varied but repetitive. Using conventional power conversion circuits, a radio's input current would have the same form as its RF power output, so the radio's input power leads would fail the CE101 requirement.

A conventional solution for limiting ripple current is to install an LC filter between a power supply and a wireless radio. However, at low frequencies, an inductor in the LC filter typically needs to be extremely large. A rule of thumb is that the filter needs to be at least twice as large and twice as heavy as the transmitter it is filtering. This negatively impacts the size, weight, and cost of the wireless radio.

SUMMARY

This disclosure provides a constant input current filter using high-frequency switching for power supplies and related system and method.

In a first embodiment, a system includes a constant input current filter configured to draw a constant input current from a power source and to generate a variable output current. The constant input current filter includes a capacitor, a boost converter, and a buck converter. The boost converter is configured to receive at least a portion of the input current and to charge the capacitor using at least the portion of the input current during first time periods associated with operation of a load. The buck converter is configured to discharge the capacitor and to provide an additional current as part of the output current during second time periods associated with operation of the load.

In a second embodiment, a method includes drawing a constant input current from a power source and generating a variable output current using a constant input current filter. The method also includes, during first time periods associated with operation of a load, receiving at least a portion of the input current and charging a capacitor with at least the portion of the input current using a boost converter in the constant input current filter. The method further includes, during second time periods associated with operation of the load, discharging the capacitor and providing an additional current as part of the output current using a buck converter in the constant input current filter.

In a third embodiment, an apparatus includes a boost converter and a buck converter configured to be coupled to a capacitor to form a constant input current filter that draws a constant input current from a power source and generates a variable output current. The boost converter is configured to receive at least a portion of the input current and to charge the capacitor using at least the portion of the input current during first time periods associated with operation of a load. The buck converter is configured to discharge the capacitor and provide an additional current as part of the output current during second time periods associated with operation of the load.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIG. 1 through 4, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
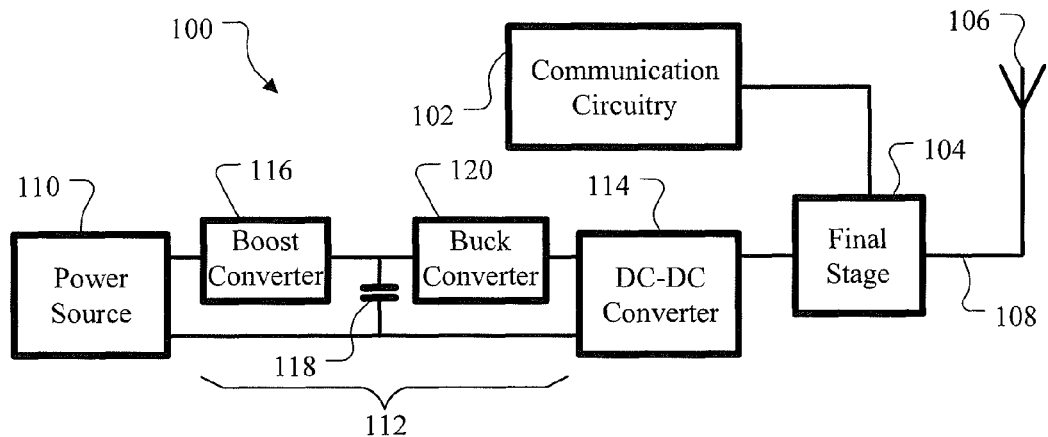
FIG. 1 illustrates an example system having a constant input current filter using high-frequency switching in accordance with this disclosure.

FIG. 1 illustrates an example system 100 having a constant input current filter using high-frequency switching in accordance with this disclosure. As shown in FIG. 1, the system 100 includes communication circuitry 102 coupled to a final stage 104. The communication circuitry 102 generally represents components used to prepare signals for wireless transmission and/or to process signals received wirelessly. The communication circuitry 102 could include any suitable components to perform any suitable communications functions. For instance, the communication circuitry 102 could include a transmit path that uses filters, amplifiers, mixers, and other components to up-convert a baseband signal into an intermediate frequency or radio frequency (RF) signal. The communication circuitry 102 could also include a receive path that uses filters, amplifiers, mixers, and other components to down-convert an intermediate frequency or RF signal into a baseband signal. The communication circuitry 102 could include any other or additional components according to particular needs.

The final stage 104 generally represents the components used to generate or prepare wireless signals for transmission by an antenna 106 and/or to process signals received wirelessly by the antenna 106. For example, the final stage 104 could include a power amplifier for generating or amplifying RF signals for wireless transmission. The final stage 104 could include any other or additional components according to particular needs.

The antenna 106 represents any suitable structure for transmitting and/or receiving wireless signals, such as any suitable RF antenna. Note that while the use of RF signals is described here, the system 100 could include a wireless radio that communicates using any other suitable wireless signals. When other types of signals are used, appropriate components can be used in the communication circuitry 102 and the final stage 104 for handling those signal types.

The final stage 104 is coupled to the antenna 106 by a wired connection 108. The wired connection 108 represents any suitable connector that transports electrical signals to the antenna 106 for wireless transmission and/or from the antenna 106 during wireless reception. In some embodiments, the wired connection 108 represents a coaxial cable.

In this example, a power supply system provides power to the final stage 104 and typically other components, such as other components of the system 100 or other components within a larger device or system (like other components of a military aircraft or submarine). In this example, the power supply system includes a power source 110, a constant input current filter 112, and a DC-DC converter 114. The power source 110 represents any suitable source of operating power for the system 100, such as at least one battery, fuel cell, solar cell, or other power supply. In particular embodiments, the power source 110 represents a power supply on a military aircraft or submarine. The constant input current filter 112 represents a filter that helps to ensure that the current drawn from the power source 110 undergoes little if any ripple and therefore remains constant (at least for a given time period). The DC-DC converter 114 represents any suitable structure configured to convert energy from one direct current (DC) form to another. The DC-DC converter 114 could, for instance, represent a buck, boost, buck-boost, or other type of voltage converter.

As noted above, the constant input current filter 112 helps to ensure that ripple current drawn from the power source 110 by the final stage 104 is substantially reduced or eliminated, helping a wireless radio that includes the components 102-104 to satisfy requirements such as the CE101 requirements. In this example, the constant input current filter 112 includes a boost converter 116, a capacitor 118, and a buck converter 120. The boost converter 116 generally operates to store energy in the capacitor 118, thereby decreasing current flowing to the final stage 104. This can be done, for instance, during times when less current is needed by the final stage 104, such as when the final stage 104 is turned off. The buck converter 120 generally operates to remove energy from the capacitor 118, thereby increasing the current flowing to the final stage 104. This can be done, for instance, during times when more current is needed by the final stage 104, such as when the final stage 104 is turned on.

In this way, energy from the power source 110 can be stored on the capacitor 118 when less energy is needed by a load, and energy from the capacitor 118 can be provided to the load when more energy is needed by the load. In effect, the constant input current filter 112 converts what would be a time-varying current from the power source 110 into a time-varying voltage on the capacitor 118. In other words, a ripple current that would have otherwise been present on the power source 110 is transformed into a ripple voltage on the capacitor 118, and a constant input current from the power source 110 is achieved. Moreover, transistors in the boost converter 116 and the buck converter 120 can be switched at high frequencies, which allows inductors used in the boost converter 116 and the buck converter 120 to have smaller sizes (possibly significantly smaller sizes). In addition, boost and buck converters 116 and 120 can represent highly efficient structures for storing energy on and releasing energy from the capacitor 118, which helps to provide an efficient mechanism for reducing or eliminating ripple current.

Figure 2:
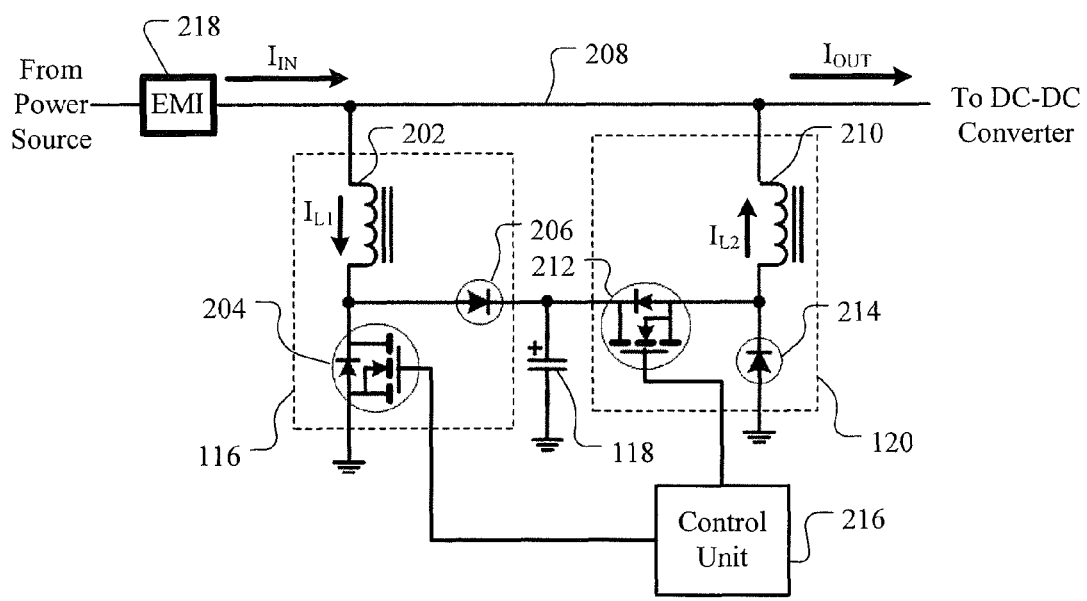
FIG. 2 illustrates an example constant input current filter using high-frequency switching in accordance with this disclosure.

The boost converter 116 represents any suitable structure for storing energy on a capacitor. The buck converter 120 represents any suitable structure for releasing energy from a capacitor. Example embodiments of the boost converter 116 and the buck converter 120 are shown in FIG. 2, which is described below. The capacitor 118 represents any suitable capacitive structure having any suitable capacitance, such as a capacitor having a capacitance of about 60,000 µF. While the capacitor 118 may be quite large and take several seconds to charge up at system turn on if in-rush limit requirements (that are usually imposed) are followed, this can be acceptable, particularly when a wireless radio performs numerous digital processing operations at start up and the radio does not output any RF signals until control circuits are functioning properly.

In one aspect of operation, the power source 110 provides a steady (constant) current. When wireless transmissions are not occurring and the final stage 104 requires little if any power, current from the power source 110 is used by the boost converter 116 to charge the capacitor 118. When wireless transmissions are occurring and the final stage 104 requires more power, current from the power source 110 and additional current discharged from the capacitor 118 via the buck converter 120 are supplied to the DC-DC converter 114 for use as an input current to the final stage 104.

As the wireless radio is operating, a varying transmit power can result in a varying input current to the final stage 104, which results in a varying output current from the DC-DC converter 114 and thus a varying input current to the DC-DC converter 114. The constant input current filter 112 helps to prevent this varying input current to the DC-DC converter 114 from appearing as a ripple current to the power source 110. Instead, it is the capacitor's voltage and discharging current that vary with the input current to the final stage 104. This results in a ripple voltage on the capacitor 118 but little if any ripple current on the power source 110.

In this way, a wireless radio having a time-varying output power characteristic can satisfy a requirement that it draw constant input current. The constant input current filter 112 can therefore be added in front of the wireless radio to effectively act as an electronic filter. This can enable, for example, a large number of wireless radios to more easily satisfy the CE101 requirements. Moreover, some devices may be required to comply with U.S. and NATO "TEMPEST" requirements. For some devices, it may be possible to glean secure information from a device by monitoring its input current. Use of the constant input current filter 112 along with a wireless radio or other device (particularly when integrated on a single integrated circuit chip) can help to ensure compliance with TEMPEST or similar requirements.

In particular embodiments, the final stage 104 could share a common ground with one end of a coaxial cable forming the wired connection 108, and that common ground could also function as a DC return for the DC-DC converter 114. The other end of the coaxial cable forming the wired connection 108 could be grounded at the chassis of a larger device or system, such as an aircraft chassis.

Although FIG. 1 illustrates one example of a system 100 having a constant input current filter 112 using high-frequency switching, various changes may be made to FIG. 1. For example, as noted above, the system 100 could be used with a wireless radio or other device that transmits signals at any suitable frequency or frequencies and is not limited to use with RF devices. Also, the constant input current filter 112 need not be used with a wireless radio at all and could be used with any electronic device having a time-varying output power characteristic with a requirement for constant input current. Other example uses of the constant input current filter 112 include use in systems that have high peak-to-average power systems. Particular uses include military platforms and cellular or other wireless base stations.

FIG. 2 illustrates an example constant input current filter 112 using high-frequency switching in accordance with this disclosure. As shown in FIG. 2, the power source 110 provides an input current and a variable output current $I_{OUT}$ is provided to the DC-DC converter 114. The constant input current filter 112 operates to store energy on and release energy from the capacitor 118 so that the input current $I_{IN}$ from the power source 110 is constant with little if any ripple, even though the output current $I_{OUT}$ is variable.

In this example, the boost converter 116 includes an inductor 202, an n-type field effect transistor (NFET) 204, and a diode 206. The inductor 202 is coupled to a drain of the NFET 204 and to a signal line 208 coupling the power source 110 and the DC-DC converter 114. The drain of the NFET 204 and the inductor 202 are also coupled to an anode of the diode 206. A cathode of the diode 206 is coupled to the capacitor 118, and a source of the NFET 204 is coupled to ground. When conductive, the NFET 204 couples the inductor 202 to ground.

The buck converter 120 here includes an inductor 210, an NFET 212, and a diode 214. The inductor 210 is coupled to a source of the NFET 212 and to the signal line 208. The source of the NFET 212 and the inductor 210 are also coupled to a cathode of the diode 214. An anode of the diode 214 is coupled to ground, and a drain of the NFET 212 is coupled to the capacitor 118. When conductive, the NFET 212 couples the capacitor 118 to the inductor 210.

When the final stage 104 stops drawing significant current (such as when the output current $I_{OUT}$ drops to nearly zero), the NFET 204 is actively switched on and off to draw at least part of the input current $I_{IN}$ through the inductor 202. The current through the inductor 202 is denoted $I_{L1}$. The NFET 204 switches at a high rate, allowing the inductor 202 to be relatively small. On average, the boost converter 116 draws an amount of current needed to keep the input current $I_{IN}$ constant. The current drawn from the input is stored in the capacitor 118 as energy $E=\frac{1}{2}CV^2$, where C denotes the capacitance of the capacitor 118 and V denotes the voltage on the capacitor 118. When the final stage 104 starts drawing more current, the switching action of the NFET 204 stops, and the NFET 212 is actively switched on and off. The energy in the capacitor 118 is now released through the inductor 210, adding to the input current $I_{IN}$. The current through the inductor 210 is denoted $I_{L2}$. This cycle can be repeated when the load current drops to near zero again. The net energy in the capacitor 118 may not change over time, and the input current $I_{IN}$ remains constant.

In this example, the switching of the NFETs 204 and 212 is controlled by a control unit 216. The control unit 216 generates drive signals for gates of the NFETs 204 and 212. The drive signals are generated so that the input current $I_{IN}$ remains constant both during periods where the final stage 104 is turned on and operating and during periods where the final stage is turned off. As noted above, by driving the NFETs 204 and 212 appropriately, a ripple current on the power source 110 is converted into a ripple voltage on the capacitor 118. The ripple voltage on the capacitor 118 is proportional to the load current used by the final stage 104 during active operation and the on/off duty ratios of the NFETs 204 and 212. The average capacitor voltage on the capacitor 118 can be higher than the maximum input voltage. Safe operation during brown-outs and black-outs can be maintained by turning the boost converter 116 and the buck converter 120 off (such as by disabling the drive signals to the gates of the NFETs 204 and 212).

Note that in particular embodiments, the constant input current filter 112 shown in FIG. 2 can be capable of providing hold-up during dropouts, such as dropouts that are several milliseconds in length. As such, the system 100 can continue operating properly even with a temporary loss of power from the power source 110. Also, in particular embodiments, an electromagnetic interference (EMI) filter 218 can be used to help remove switching noise introduced by the NFETs 204 and 212. The electromagnetic interference can be easily filtered because it is at the NFETs' normal switching frequencies. In addition, as noted above, the two inductors 202 and 210 can be small when a suitably high switching frequency, such as between about 100 kHz and about 300 kHz, is used.

The control unit 216 can use any suitable technique to generate the drive signals for the NFETs 204 and 212. For example, the control unit 216 could generate the drive signals using pulse width modulation based on one or more characteristics of the load receiving the output current $I_{OUT}$. In this example, the control unit 216 can modify the duty cycle(s) of the drive signals for the NFETs 204 and 212 based on the load receiving the output current $I_{OUT}$. If more current is needed during operation of the final stage 104, the drive signals for the NFETs 204 and 212 can have larger duty cycles, thereby allowing more energy to be stored on and released from the capacitor 118. If less current is needed during operation of the final stage 104, the drive signals for the NFETs 204 and 212 can have smaller duty cycles, thereby allowing less energy to be stored on and released from the capacitor 118.

Each inductor 202 and 210 represents any suitable inductive structure having any suitable inductance. Each NFET 204 and 212 represents any suitable transistor structure, such as an n-type MOSFET. Each diode 206 and 214 represents any suitable structure for substantially limiting current flow to one direction. The control unit 216 includes any suitable structure for controlling the boost and buck converters 116 and 120. The control unit 216 could, for example, include at least one microprocessor, microcontroller, digital signal processor (DSP), field programmable gate array (FPGA), application specific integrated circuit (ASIC), or other processing device. The EMI filter 218 includes any suitable structure for filtering switching noise.

Note that in this example, the boost converter 116 need not generate a fixed output voltage that is provided to the capacitor 118. As such, the boost converter 116 operates in a manner different than conventional boost converters, which typically attempt to constantly generate a fixed regulated output voltage.

Although FIG. 2 illustrates one example of a constant input current filter 112 using high-frequency switching, various changes may be made to FIG. 2. For example, the boost and buck converters 116 and 120 could be implemented using any other suitable arrangements of components.

Figure 3:
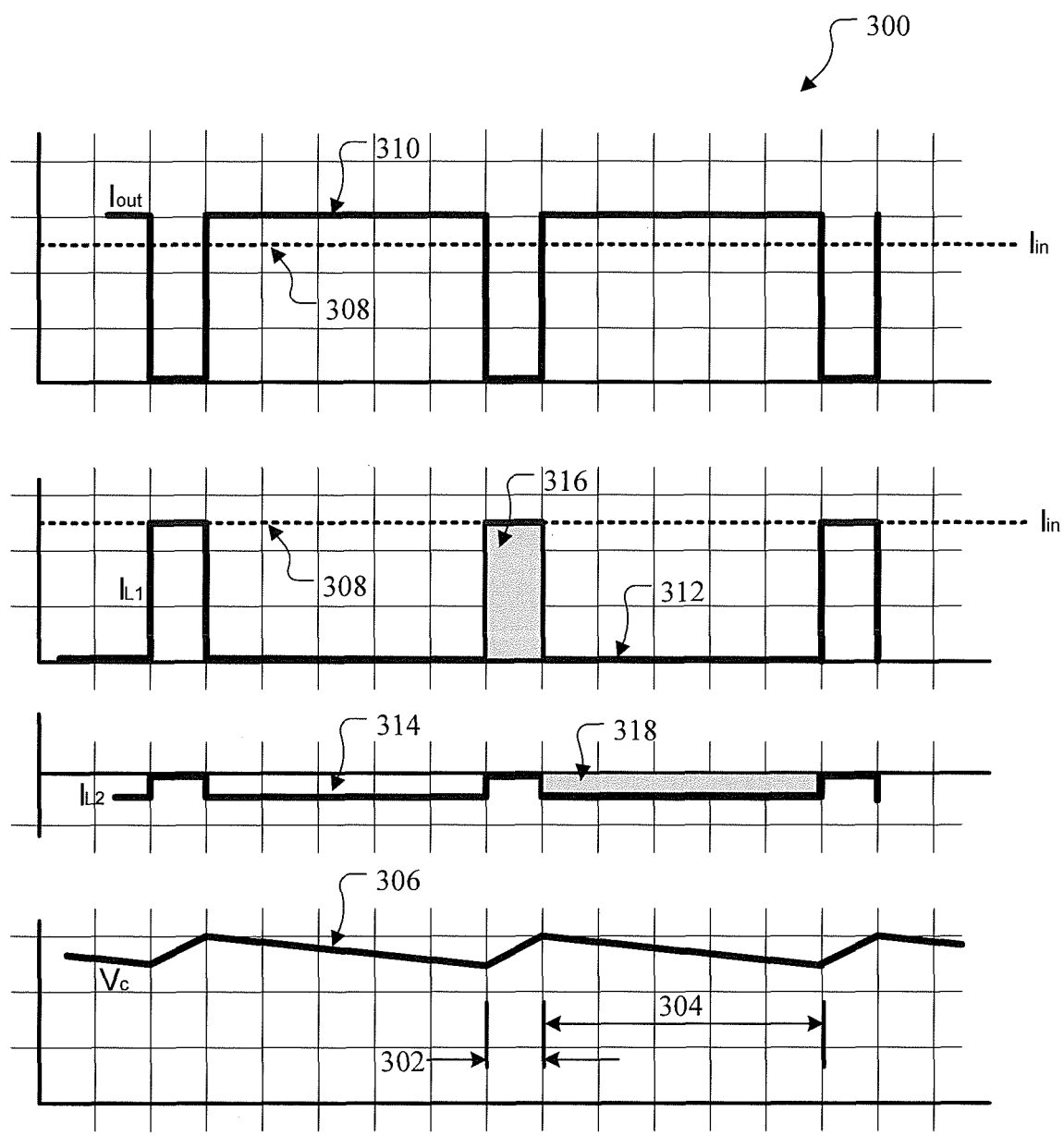
FIG. 3 illustrates example operational characteristics of a constant input current filter using high-frequency switching in accordance with this disclosure.

FIG. 3 illustrates example operational characteristics of the constant input current filter 112 using high-frequency switching in accordance with this disclosure. As shown in FIG. 3, the operation of the constant input current filter 112 is repetitive and includes two different repeating time periods, namely charging times 302 and discharging times 304. As shown by line 306, the voltage $V_C$ on the capacitor 118 increases during the charging times 302 and decreases during the discharging times 304. When the capacitor voltage $V_C$ is increasing during times 302, the final stage 104 is not transmitting, so at least a portion of the input current $I_{IN}$ can be used to charge the capacitor 118. When the capacitor voltage $V_C$ is decreasing during times 304, the final stage 104 is transmitting, and part of the current needed by the final stage 104 comes from discharging the capacitor 118. Various charging times 302 and discharging times 304 are shown in Table 1, although these values are for illustration only.

TABLE 1

| High Current (Time on) | Low Current (Time off) |
| --- | --- |
| 7 ms | 2 ms |
| 1 s | 10 ms |
| 0.5 s | 10 ms |
| 0.25 s | 10 ms |
| 0.125 s | 10 ms |
| 400 μs | 100 μs |

As shown in FIG. 3, line 308 represents the input current $I_{IN}$, and line 310 represents the output current $I_{OUT}$. Also, line 312 represents the current $I_{L1}$ through the inductor 202, and line 314 represents the current $I_{L2}$ through the inductor 210. As shown here, the output current $I_{OUT}$ drops to or near zero during the charging times 302, while the current $I_{L1}$ through the inductor 202 increases to be near or equal the input current $I_{IN}$ during the charging times 302. The current $I_{L2}$ through the inductor 210 is generally zero during the charging times 302. This indicates that all or substantially all of the input current $I_{IN}$ is routed through the inductor 202 during the charging times 302, allowing the voltage on the capacitor 118 to increase.

The output current $I_{OUT}$ increases above the input current $I_{IN}$ during the discharging times 304. During these times 304, the current $I_{L1}$ through the inductor 202 is generally zero, and the current $I_{L2}$ through the inductor 210 increases. Note that the current $I_{L2}$ is shown in FIG. 3 as having the opposite polarity as the current $I_{L1}$, which is done merely to show that the currents flow in different directions with respect to the signal line 208. This indicates that all or substantially all of the input current $I_{IN}$ is routed through the signal line 208 during the discharging times 304, and an additional current $I_{L2}$ is combined with the input current $I_{IN}$ to generate the larger output current $I_{OUT}$.

As can be seen here, the current $I_{OUT}$ provided to the final stage 104 typically changes value. For example, as described above, the amount of current provided to the final stage 104 can vary depending on whether the final stage 104 is actively generating a signal for transmission. Also, the amount of current provided to the final stage 104 can vary depending on the transmit waveform and the required transmit output power. The current $I_{OUT}$ therefore repeatedly increases and decreases as the wireless radio is transmitting (keyed) and not transmitting (un-keyed). The capacitor 118 is used to store and release energy so that the input current $I_{IN}$ is able to remain constant. In particular embodiments, the capacitor 118 is relatively large to support the required transmit current, while the input current changes at a rate that is below a specified frequency such as 30 Hz. Note that the constant input current filter 112 may need time to achieve an optimal bias point after abrupt changes in the RF output waveform, so additional circuits and inputs could be used to "predict" the expected correct operating point in order to speed up performance.

Note that in FIG. 3, an area 316 is associated with the line 312 representing the inductor current $I_{L1}$, and an area 318 is associated with the line 314 representing the inductor current $I_{L2}$. These areas 316-318 represent quantities in amp-seconds and are associated with current flow through the inductors 202 and 210. Ideally, these areas 316-318 are equal so that the energy in the capacitor 218 remains balanced to a net non-change.

Although FIG. 3 illustrates examples of operational characteristics of the constant input current filter 112 using high-frequency switching, various changes may be made to FIG. 3. For instance, FIG. 3 illustrates operational characteristics associated with a specific implementation of the constant input current filter 112. Other constant input current filters that are implemented differently could have different operational characteristics.

Figure 4:
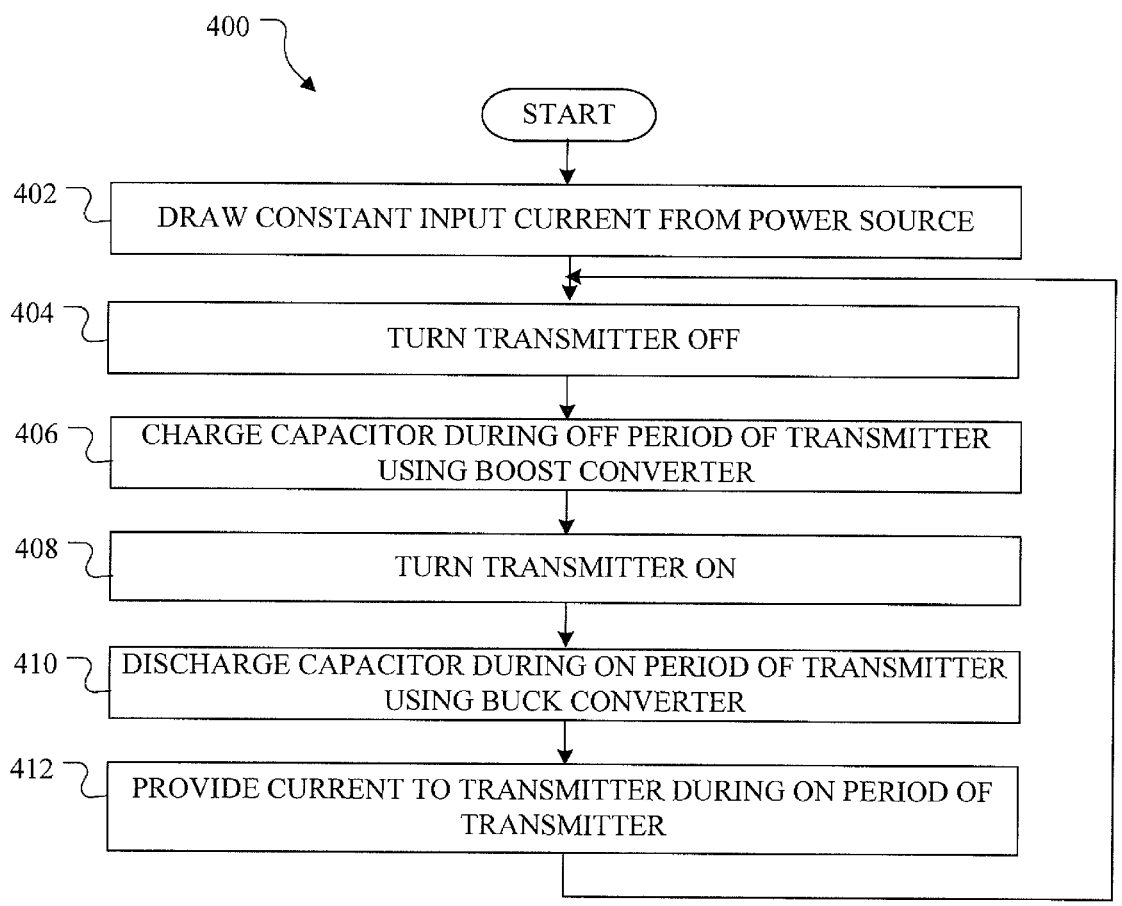
FIG. 4 illustrates an example method for providing a constant input current with a constant input current filter using high-frequency switching in accordance with this disclosure.

FIG. 4 illustrates an example method 400 for providing a constant input current with a constant input current filter using high-frequency switching in accordance with this disclosure. As shown in FIG. 4, a constant input current is drawn from a power source at step 402. This could include, for example, the constant input current filter 112 operating to ensure that a constant input current is drawn from the power source 110 in the system 100.

During this time, a transmitter is turned off at step 404, and a capacitor is charged during the off period of the transmitter using a boost converter at step 406. This could include, for example, turning off the final stage 104 in the system 100. This could also include using the boost converter 116 to charge the capacitor 118. The transmitter is turned on at step 408, and the capacitor is discharged during the on period of the transmitter using a buck converter at step 410. This could include, for example, turning on the final stage 104 in the system 100. This could also include discharging the capacitor 118 using the buck converter 120, which generates an additional current (a discharge current) that combines with an input current from the power source 110. Current is provided to the transmitter during the on period of the transmitter at step 412. This could include, for example, providing the input current $I_{IN}$ and the discharge current (inductor current $I_{L2}$ in FIG. 2) to the final stage 104.

In this way, the transmitter receives the necessary input current during its on times, while the capacitor 118 is charged during off times of the transmitter. As a result, little if any ripple current appears at the power source 110 from the transmitter. As noted above, the control unit 216 can control the operations of the buck and boost converters 116 and 120 based on the load receiving the output current $I_{OUT}$ to ensure that the converters 116 and 120 operate appropriately to keep the input current $I_{IN}$ constant.

Although FIG. 4 illustrates one example of a method 400 for providing a constant input current with a constant input current filter using high-frequency switching, various changes may be made to FIG. 4. For example, the same or similar method could be used for any load having a time-varying output power characteristic with a requirement for constant input current. Also, while shown as a series of steps, various steps in FIG. 4 could overlap, occur in parallel, occur in a different order, or occur any number of times.

It may be advantageous to set forth definitions of certain words and phrases used throughout this patent document. The term "couple" and its derivatives refer to any direct or indirect communication between two or more elements, whether or not those elements are in physical contact with one another. Terms such as "transmit," "receive," and "communicate," as well as their derivatives, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "constant" means at least substantially constant, and a constant input current denotes a current that is substantially constant.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
a constant input current filter configured to draw a constant input current from a power source and to generate a variable output current, the constant input current filter comprising:
a signal line connecting an input and an output of the constant input current filter, the signal line configured to receive the input current and provide the output current;
a capacitor;
a boost converter coupled to the signal line, the boost converter configured to receive at least a portion of the input current and to store energy in the capacitor using at least the portion of the input current during first time periods associated with operation of a load; and
a buck converter coupled to the signal line, the buck converter configured to discharge the stored energy in the capacitor and to provide an additional current as part of the output current during second time periods associated with operation of the load;
wherein at least one of:
the signal line comprises a conductor directly coupled to the input and the output of the constant input current filter; and
the constant input current filter is configured such that at least part of the input current is able to flow through the signal line from the input to the output of the constant input current filter without passing through the boost and buck converters during at least some of the time periods.

2. The system of claim 1, wherein the boost converter comprises:
an inductor configured to receive at least the portion of the input current;
a transistor configured to selectively couple the inductor to ground; and
a diode coupled between the inductor and the transistor, the diode also coupled to the capacitor.

3. The system of claim 1, wherein the buck converter comprises:
an inductor configured to provide the additional current;
a diode coupled to the inductor and to ground; and
a transistor coupled between the inductor and the diode, the transistor also coupled to the capacitor, the transistor configured to selectively couple the capacitor to the inductor.

4. The system of claim 1, further comprising:
a control unit configured to drive transistors in the boost and buck converters.

5. The system of claim 1, further comprising:
a DC-DC converter configured to receive the output current and to be coupled to the load.

6. The system of claim 1, wherein the load comprises an electronic device having a time-varying output power characteristic.

7. The system of claim 1, wherein:
the load comprises a wireless radio;
the first time periods comprise time periods when the wireless radio is not transmitting; and
the second time periods comprise time periods when the wireless radio is transmitting.

8. The system of claim 4, wherein the control unit is configured to drive the transistors in the boost and buck converters based on the load.

9. A method comprising:
drawing a constant input current from a power source, the input current flowing through a signal line connecting an input and an output of a constant input current filter; and
generating a variable output current using the constant input current filter;
wherein generating the variable output current comprises:
during first time periods associated with operation of a load, receiving at least a portion of the input current and storing energy in a capacitor using a boost converter in the constant input current filter, the boost converter coupled to the signal line; and
during second time periods associated with operation of the load, discharging the stored energy in the capacitor and providing an additional current as part of the output current using a buck converter in the constant input current filter, the buck converter coupled to the signal line;
wherein at least one of:
the signal line comprises a conductor directly coupled to the input and the output of the constant input current filter; and
the constant input current filter is configured such that at least part of the input current flows through the signal line from the input to the output of the constant input current filter without passing through the boost and buck converters during at least some of the time periods.

10. The method of claim 9, wherein the boost converter comprises:
an inductor configured to receive at least the portion of the input current;

a transistor configured to selectively couple the inductor to ground; and a diode coupled between the inductor and the transistor, the diode also coupled to the capacitor.

11. The method of claim 9, wherein the buck converter comprises:

an inductor configured to provide the additional current;

a diode coupled to the inductor and to ground; and a transistor coupled between the inductor and the diode, the transistor also coupled to the capacitor, the transistor configured to selectively couple the capacitor to the inductor.

12. The method of claim 9, further comprising:

driving transistors in the boost and buck converters using a control unit.

13. The method of claim 9, further comprising:

providing the output current and the additional current to a DC-DC converter that is coupled to the load.

14. The method of claim 9, wherein the load comprises an electronic device having a time-varying output power characteristic.

15. The method of claim 9, wherein:

the load comprises a wireless radio;

the first time periods comprise time periods when the wireless radio is not transmitting; and the second time periods comprise time periods when the wireless radio is transmitting.

16. The method of claim 9, wherein the load and the constant input current filter collectively comply with a CE101 power lead requirement.

17. The method of claim 9, wherein substantially all of the input current flows through the signal line from the input to the output of the constant input current filter without passing through the boost and buck converters during the second time periods.

18. The method of claim 12, wherein driving the transistors comprises driving transistors in the boost and buck converters based on the load.

19. An apparatus comprising:

a signal line; and a boost converter and a buck converter coupled to the signal line and configured to be coupled to a capacitor to form a constant input current filter that draws a constant input current from a power source and generates a variable output current;

wherein the signal line connects an input and an output of the constant input current filter, the signal line configured to receive the input current and provide the output current;

wherein the boost converter is configured to receive at least a portion of the input current and to store energy in the capacitor using at least the portion of the input current during first time periods associated with operation of a load;

wherein the buck converter is configured to discharge the stored energy in the capacitor and provide an additional current as part of the output current during second time periods associated with operation of the load; and wherein at least one of:

the signal line comprises a conductor directly coupled to the input and the output of the constant input current filter; and the constant input current filter is configured such that at least part of the input current is able to flow through the signal line from the input to the output of the constant input current filter without passing through the boost and buck converters during at least some of the time periods.

20. The apparatus of claim 19, wherein the boost converter comprises:

an inductor configured to receive at least the portion of the input current;

a transistor configured to selectively couple the inductor to ground; and a diode coupled between the inductor and the transistor, the diode also configured to be coupled to the capacitor.

21. The apparatus of claim 19, wherein the buck converter comprises:

an inductor configured to provide the additional current;

a diode coupled to the inductor and to ground; and a transistor coupled between the inductor and the diode, the transistor also configured to be coupled to the capacitor, the transistor configured to selectively couple the capacitor to the inductor.

* * * * *